Dec. 22, 1970   J. B. COLGAN ET AL   3,550,091
WHOLE WORD JUSTIFICATION AND EDITING SYSTEM
Filed Nov. 15, 1968   11 Sheets-Sheet 4

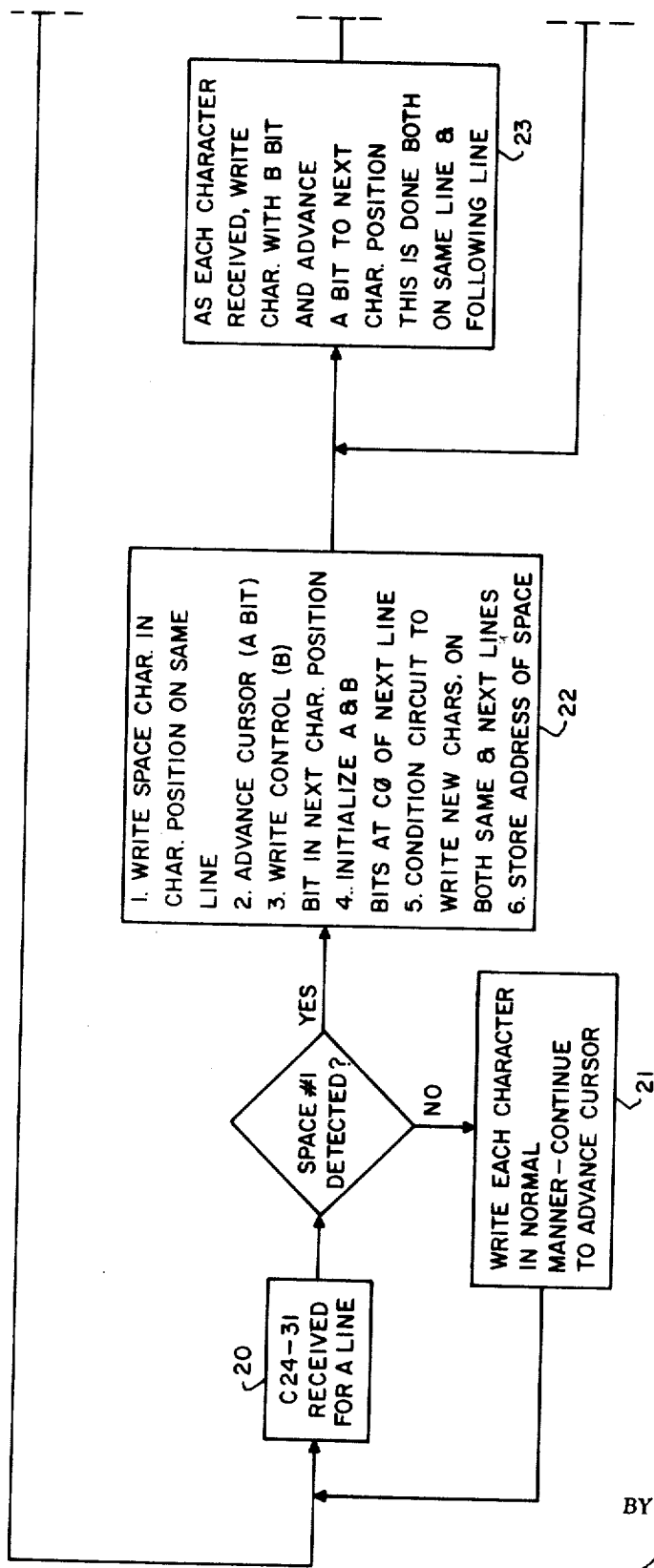

United States Patent Office 3,550,091
Patented Dec. 22, 1970

3,550,091
WHOLE WORD JUSTIFICATION AND EDITING SYSTEM
James Basil Colgan, Stamford, Angelo John Di Giugno, Norwalk, and Robert James Duggan, Monroe, Conn., assignors to The Bunker-Ramo Corporation, Stamford, Conn., a corporation of Delaware
Filed Nov. 15, 1968, Ser. No. 776,119
Int. Cl. B41b 3/06
U.S. Cl. 340—172.5                              7 Claims

ABSTRACT OF THE DISCLOSURE

A system for editing characters of information which are to be stored in a multiline format with a maximum of N characters per line in a manner such that a maximum number of characters are stored on each line while permitting breaks between lines to occur only at natural break points in the information. A means for detecting natural break points is provided. The first break point detected after a predetermined number of characters have been stored on a given line causes subsequently received characters to be stored in succeeding positions on a given line and in character positions starting at the first character position on the following line. The detection of the first subsequent break point on the given line causes erasure at the characters stored on the following line while the failure to detect a break point between the last detected break point on the given line and the beginning of the next line causes erasure of the characters stored after the last break point on the given line.

---

This invention relates to a system for dividing serially received information, which information is to be stored and/or dsplayed, into a multi-line format with each line being of no more than a predetermined length; and more particularly, to an editing system of the type described which permits a maximum amount of information to be stored on each line while allowing breaks in information between lines to occur only at natural break points in the information.

Various services are presently available which convey information from a central source to a number of remote locations at each of which location the information is stored and displayed. Examples of such services include the various commercial and private news wire services and the stock market ticker line which convey information as a various transactions on the stock exchanges. The information on these lines may either be a continuous stream of unformated data or may be formated into lines of predetermined length.

If the received information is formated, and the number of characters to a line in the received data is less or equal to the number of characters per line which may be accepted on the display device at the receiving station, then no problem exists. However, lines of the type mentioned are frequently applied to be displayed on a variety of different display devices. A situation therefore frequently arises where the incoming data is either unformated or formated into a line length which is greater than the line length which the display device at the receiver can accommodate. In these situations the receiving device must reformate (i.e. edit) the incoming data so as to divide it into lines of suitable length for the display device being utilized. In order to make optimum use of this display device, it is desirable that as many characters as possible be placed on each line thereof. However, in order for the information to be easily readable, it is necessary that the breaks between lines occur at the end of words (i.e. that words not be broken between lines). Further, in order that the display may have a pleasing appearance, it is desirable that the rate at which characters are written on the screen remain fairly uniform.

It is therefore a primary object of this invention to provide an improved system for editing information applied to a storage and/or display station.

A more specific object of this invention is to provide a system for dividing incoming information, which is either unformated or divided into lines of a first predetermined length into lines of a second predetermined length.

A still more specific object of this invention is to provide an editing system of a type described above in which a maximum number of characters is stored on each line while permitting breaks in information between lines to occur only at natural break points in the information such as the spaces between words.

Anothed object of this invention is to provide a system of the type described above which permits characters to be displayed at a relatively uniform rate.

In accordance with these objects this invention provides a system for editing incoming characters of information which are to be stored and/or displayed in a multi-line format with a maximum of N characters per line in a manner such that a maximum number of characters are stored on each line while permitting breaks in information between lines to occur only at natural break points in the information such as at spaces between words. The system includes a means for detecting when a natural break point occurs in the incoming information and a means responsive to the detecting of the first natural break point after a predetermined number of characters have been stored on a given line for causing subsequently received characters to be stored both in succeeding character positions on the given line and in character positions starting at the first character position of the following line. During time periods when characters are being stored on two lines, the display of these characters is suppressed. Means are provided which is responsive to the detection of a subsequent break point on a given line for erasing the characters stored on the following line and for selectively permitting the stored characters on the same line to be displayed. This display is at a simulated rate which is somewhat faster than the rate at which characters are received so as to give the impression of continuous character reception. Means are also provided which are responsive to the failure to detect a break point between the last detected break point on a given line and the beginning of the next line for erasing the characters stored after the last break point on the given line and for selectively permitting the characters stored on the following lines to be displayed. Subsequently received characters are stored in positions on the following line starting at the position following the last position in which a character was written while characters were also being written on said given line. The display of subsequently received characters is likewise inhibited with all characters, including these characters, on the following lines being displayed at the simulated (slightly faster) rate until the display catches up with the incoming data.

The foregoing and other objects, features and advantages of the invention will be apparent from the following more particular description of a preferred embodiment of the invention, as illustrated in the accompanying drawings.

In the drawings:

FIGS. 1A, 1B, and 1C are flow diagrams illustrating the editing method employed in the preferred embodiment of the invention.

FIG. 4 is a diagram illustrating how

FIGS. 4A–4G, when combined, form a composite block diagram of a preferred embodiment of the invention.

FUNCTIONAL DESCRIPTION

For the preferred embodiment of the invention it will be assumed that the system is generally of the type shown in copending application Ser. No. 618,730 entitled "Data Display Means," filed Feb. 27, 1967, on behalf of A. J. Di Guigno and J. C. Marshall, and assigned to the assignee of the instant application. In a system of this type, information, such as a stock ticker or a news wire, is continuously applied to the system, reformated by the system, stored for display, and displayed on a CRT device. Storage in this system is performed in a recirculating delay line with each character position in the delay line being associated with a corresponding character position on the CRT display. One problem which the Di Guigno et al. application was concerned with was that of formating the continuously receiving data into a multi-line format for display. The Di Guigno et al. application provides solutions to this problem which are suitable for the particular data involved. However, the Di Guigno et al. application does not attack the specific problem of optimizing the number of characters which are to be displayed on each line while still permitting the breaks between lines to occur at natural break points in the information such as at the spaces between words. This invention provides a unique solution to this specific problem.

Figure 3:
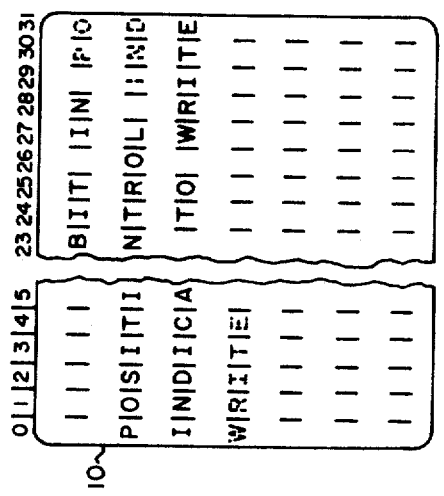
FIG. 3 is a diagram illustrating the display format for a preferred embodiment of the invention.

Referring first to FIG. 3, it will be assumed that a display screen of a CRT is provided which is adapted to display 7 lines of information each of which lines contains 32 characters. The information received may either be unformated or may be formated for lines of greater than 32 characters. For purposes of the following discussion the former situation will be assumed, although, if improperly formated data is received, the operations will be the same except that the carriage return and line feed characters in the received information will be detected and ignored. Briefly stated, the algorithm of the preferred embodiment of the invention is to search for the first space character which occurs after character 24 of a given line and to write subsequently received characters both in succeeding positions of the given line and in positions starting with character position zero of the following line. During the period that characters are being written on two lines, the display of these characters is inhibited. Each time another space is detected in the given line, the characters written on the following line are erased and the circuit is conditioned to start displaying the characters recorded on said given line at a simulated line rate. When the end of a line is reached (i.e. when a character is written in character position 31) the circuit looks to see whether the next character received is a space. If the next character received is a space then the writing of the space is suppressed, the characters written on the following line are erased, and the circuit is conditioned to continue to cause the display of the characters written on the given line at a simulated line rate. If, on the other hand, the next character is not a space, then the characters following the last space on the given line are erased the next character received is written into the character position on the following line following the position in which the last character was previously written on that line, and the circuit is conditioned to start displaying characters on the following line on a simulated line rate. The display of subsequently written characters is inhibited until the display catches up with the writing. For a preferred embodiment of the invention the timing of the circuit is such that this occurs at character 23 time.

Figure 1B:
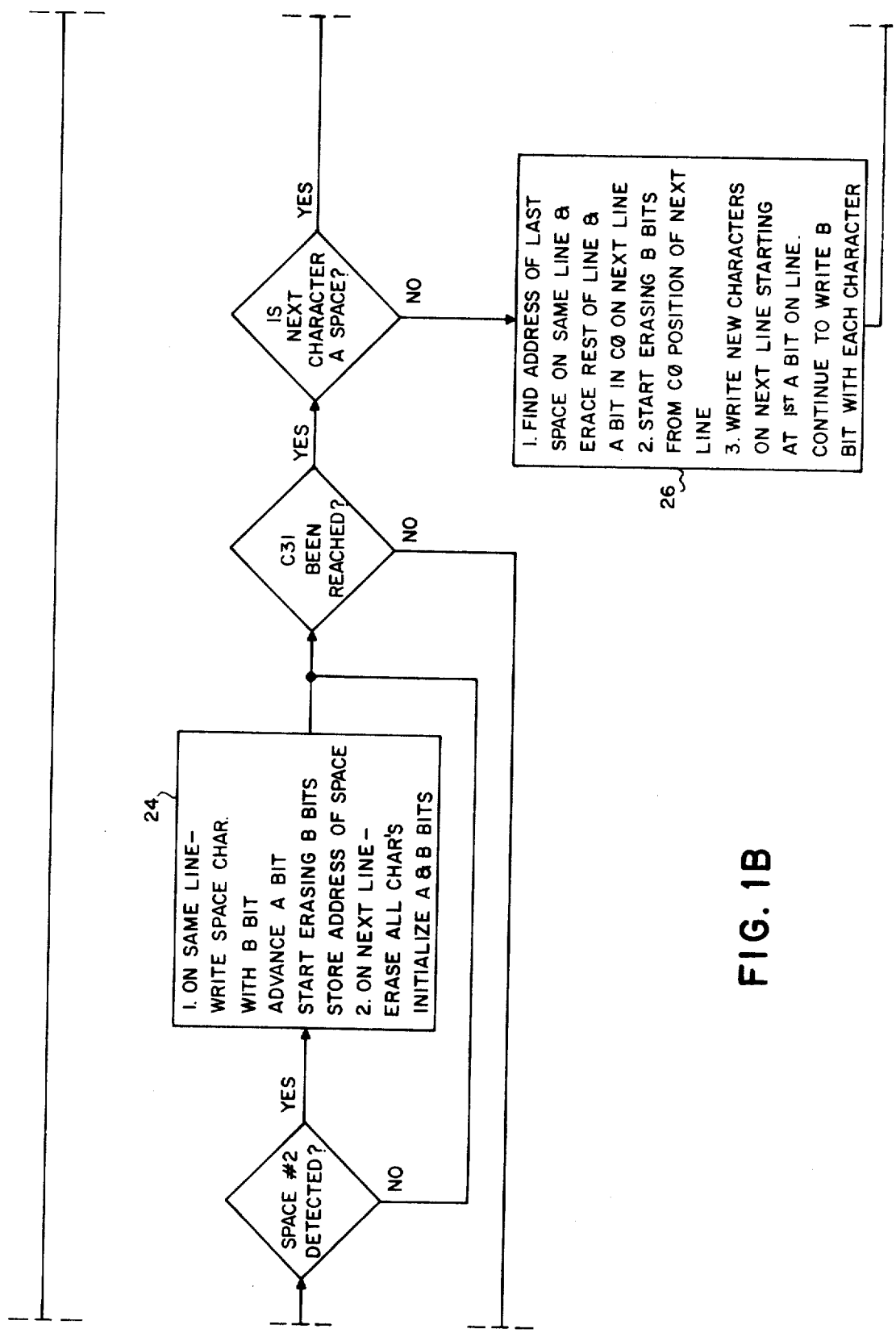
Figure 1C:
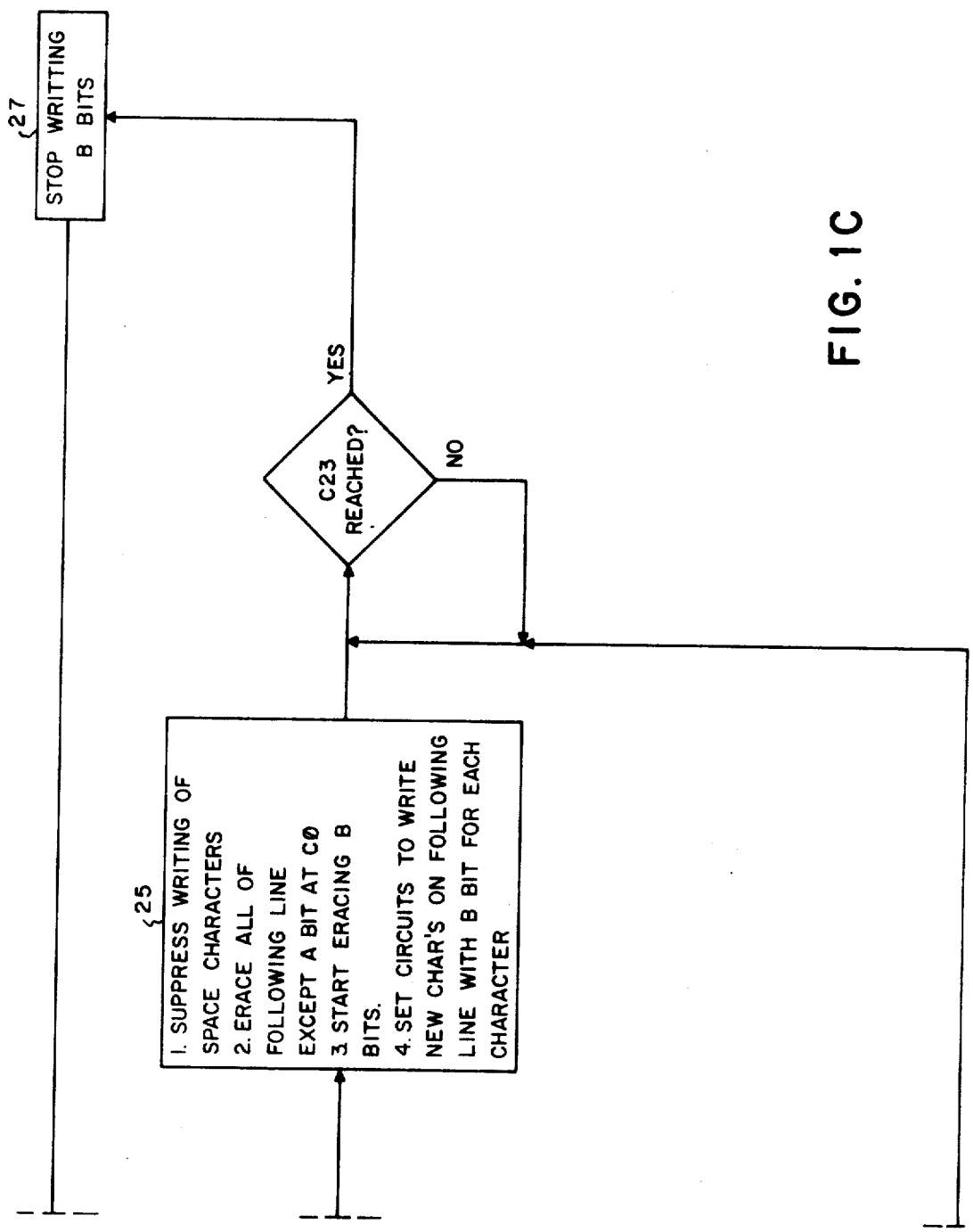
Figure 2:
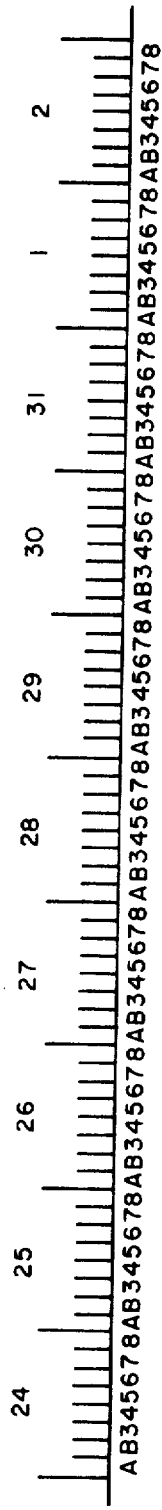
FIG. 2 is a diagram illustrating the storage format for a portion of the information to be stored.

FIG. 1 is a more detailed flow diagram of the editing procedure described above. Referring now to FIG. 1 it is seen that when a character 24 through 31 of a line is received, a decision must be made as to whether the received character is a space or not. If the character is not a space then it is recorded in the delay line memory in a normal manner. At this point reference should be made to FIG. 2 which shows the delay line storage format for a plurality of characters. From this figure it is seen that each character is made up of eight bits. The first of these bits, designated the A bit, is a cursor which is utilized to indicate the next character position in memory at which information is to be written. Under normal conditions, this bit is erased when information is written into the character position and is rewritten into the cursor bit position of the following character. The second bit in each character is designated the B bit and is utilized to control the display. When a B bit is present in a character, the display of the character is inhibited. The remaining bits, bits 3–8 of each character, contain the six-bit character designation which is received on the line. When a B bit is not present, these six bits are applied through a character generator to cause the indicated character to be displayed in a corresponding character position on the CRT.

Referring back to FIG. 1 it is thus seen that when a space is not detected in a character position 24–31 the character is written in a normal manner which means that the A-bit or cursor bit is erased in the character position written into and rewritten in the following character position. After the character has been written, the circuit checks to see if the following character received is a space. The normal writing of characters proceeds until a space character is detected at which time six operations are performed. From box 22 it is seen that when a space is detected (1) the space character is written in the character position on the same line, (2) the cursor or A-bit is advanced to the next character position (this is true any time a character is written); (3) a B-bit is written in the next character position thus inhibiting the display on any character which is written into that position; (4) A- and B-bits are initialized in the $C\phi$ position of the next line thus permitting the next received character to be written in this position but not be displaying; (5) the circuit is conditioned to write new characters on both the same and the next line; and (6) the address of the space is stored.

When these operations have been performed, the circuit proceeds (see box 23) to write subsequently received characters both on the same line and the following line. Each of these characters is written with a B-bit and, as each of these characters is written, the corresponding A-bit is advanced to the next character position. As each of these characters is written a decision is made as to whether this character is a space character. If the character is not a space character then a decision is made as to whether character position 31 has been reached. If character position 31 has not been reached, then the circuit proceeds to receive and write the next character. If a second space is detected on the same line, then the circuit performs the operations in box 24. The circuit thus writes the space character with a B-bit, advances the A-bit to the next character position, stores the address of the space, and starts erasing the B-bits which have been recorded. This erasing of B-bits occurs at a rate slightly faster than the rate in which characters are received. At the same time, on the next line, all characters which have been written are erased, and the A- and B-bits are again initialized in the character zero position. When these operations have been completed the circuit looks to see if the character position 31 has been reached and, if it has not, the circuit receives and writes the next character (i.e. returns to perform the steps of box 23).

When, either after the writing of a space character or a non-space character in the delay line, it is found that character position 31, the end of the line, has been reached, the circuit tests to see if the next character received is a space. If the next character is a space, then the break between lines has occurred at the end of a word and the circuit proceeds to perform the steps of box 25. Thus, the circuit (1) suppresses the writing of the space character; (2) erases all of the following line except the A-bit in the C$\phi$ position; (3) starts erasing B-bits on the same line; and (4) sets the circuit to write new characters on the following line with a B-bit for each character. The reason that B-bits are still recorded on the following line is that all of the B-bits on the same line have not yet been erased so that the display on the same line is not yet completed. Therefore, in order to provide a continuous appearing display, it is necessary to suppress the display of characters written on the following line until the display catches up with the writing.

If the next character received is not a space character then the break at the end of the line has occurred in the middle of a word and the circuit proceeds to perform the steps of box 26. These steps are (1) find the address of the last space on the same line and erase the rest of that line, including the A-bit in the C$\phi$ position of the following line; (2) start erasing B-bits starting with the C$\phi$ position of the following line; (3) write new characters which are received on the following line starting at the first A-bit on the line and continue to write B-bits with each character.

Regardless of whether the next character is a space or not, the circuit, as was indicated, writes characters on the following line with a B-bit being recorded with each character. This will continue until the erasing of B-bits catches up with the writing. For the preferred embodiment of the invention, the timing is such that this occurs when character 23 of the following line is being written. Therefore, a decision must be made as to whether character 23 has been reached. If this character position has not been reached, then the circuit proceeds as indicated. When this character position has been reached, the writing of B-bits is suppressed. Since the next character after character 23 is character 24, the circuit returns from this point to its initial condition where it is looking for a space in character position 24–31 of a line.

DETAILED CIRCUIT DESCRIPTION

Figure 4A:
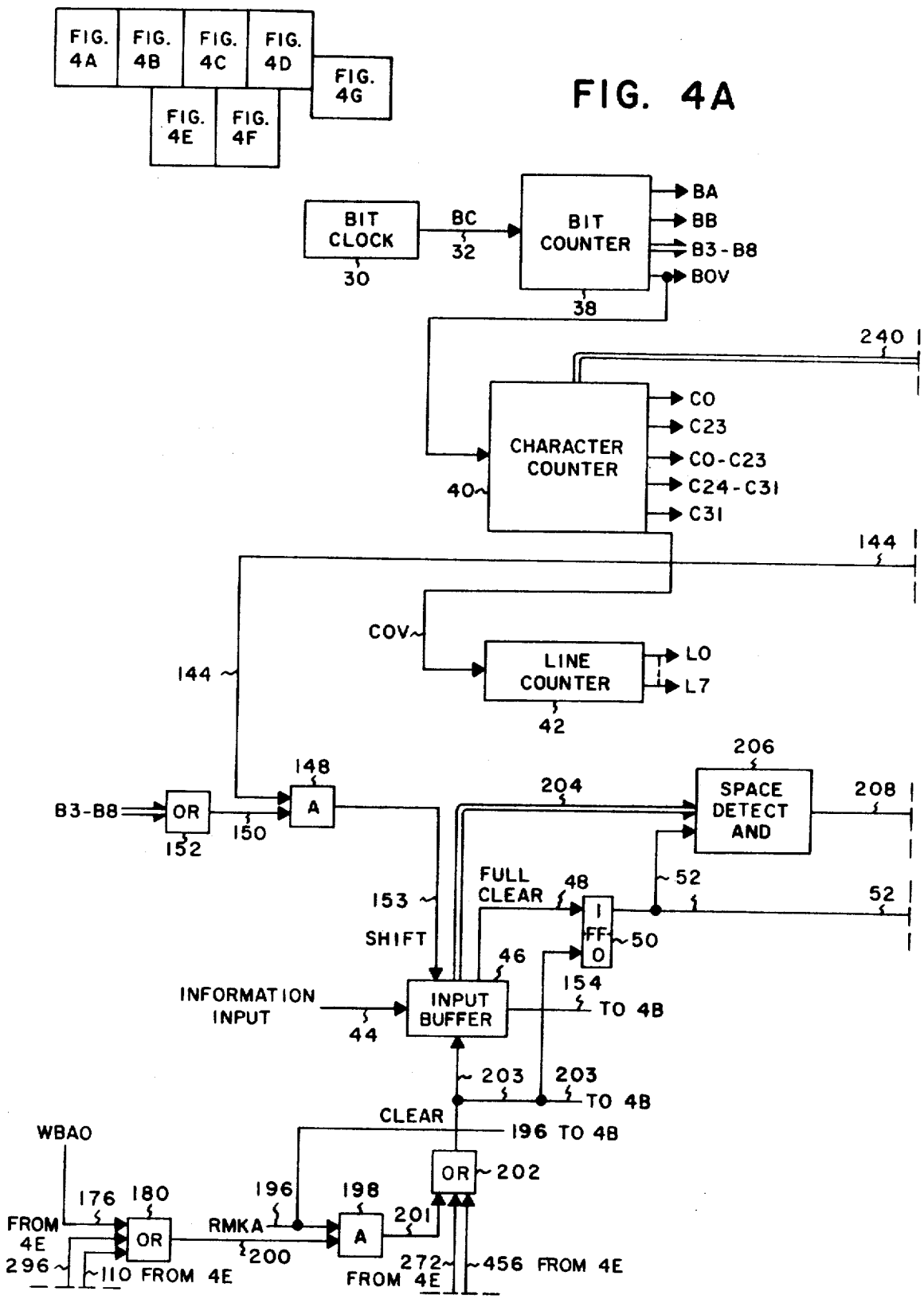
FIGS. 4A–4G are combined to form a composite block diagram of a preferred embodiment of the invention.

FIGS. 4A–4G, when combined, provide a detailed schematic block diagram of a preferred embodiment of the invention. Referring now to FIG. 4A, it is seen that a bit clock 30 is provided which clock generates BC pulses on line 32 in synchronism with the passage of each bit from delay line memory 34 (FIG. 4G) to display device 36. Display device 36 is generally of the type indicated in the before-mentioned DiGuigno et al. application and includes a character generator, a CRT, and suitable sweep and other control circuits. The nature of the display device itself does not form part of the present invention and will therefore not be described further. BC line 32 is connected as the step input to bit counter 38. Bit counter 38 is adapted to generate clock pulses corresponding to the various bit positions in each character. Thus, as an A-bit is applied to display devices 36, a signal appears on the BA clock line while, as a B-bit is applied to this device a signal appears on the BB clock line. It should be noted that the A- and B-bits of each character are not utilized by th display device. When a signal appears on the B8 line and a signal is applied through BC line 32 to bit counters 38, the counter is stepped to generate an output on the BA line again and an overflow signal appears on the BOV line which signal is applied to increment character counter 40. Character counter 40 generates output signals on character lines C0–C31 when the corresponding character is being applied to control display device 36. In addition, selected ones of the character lines are ANDed within the character counters to provide a C0–C23 clock line and a C24–C31 clock line. When a signal appears on the C31 clock line and a new input is received on the BOV line, counter 40 is incremented to cause a signal to again appear on the C0 clock line and a pulse is also applied to the COV line which pulse is applied to increment line counter 42. Line counter 42 generates signals on the L0–L7 lines respectively as characters to be displayed on these lines are applied from delay line 34 to control the display on display device 36. A new signal on the COV line when line counter 42 is generating an output on the L7 line causes the counter to be stepped to generate an output on the L0 line. In order to simplify FIGS. 4A–4G no attempt has been made to connect the various clock lines to the points in the circuit where they are utilized. Instead, at each of these points, a line appears with the proper clock designation.

Characters are applied to the system over a news wire or similar line 44 on a bit-by-bit basis and are stored in input buffer 46 (FIG. 4A). The rate at which characters are applied to input buffer 46 is relatively slow compared to the rate at which information is recirculated in delay line 34 so that at least a dozen circulations of memory 34 occur for each character applied to the buffer.

Figure 4B:
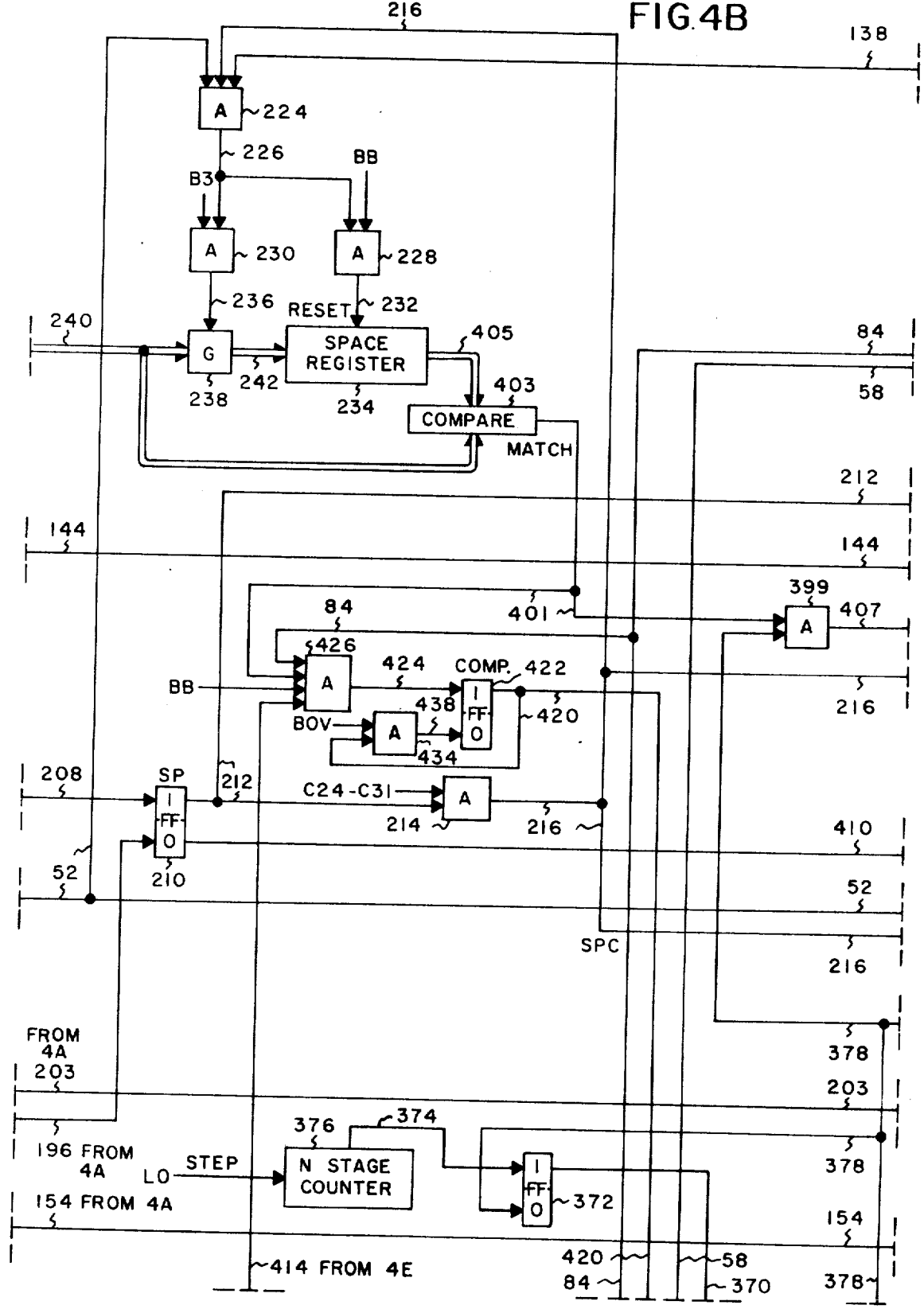
Figure 4C:
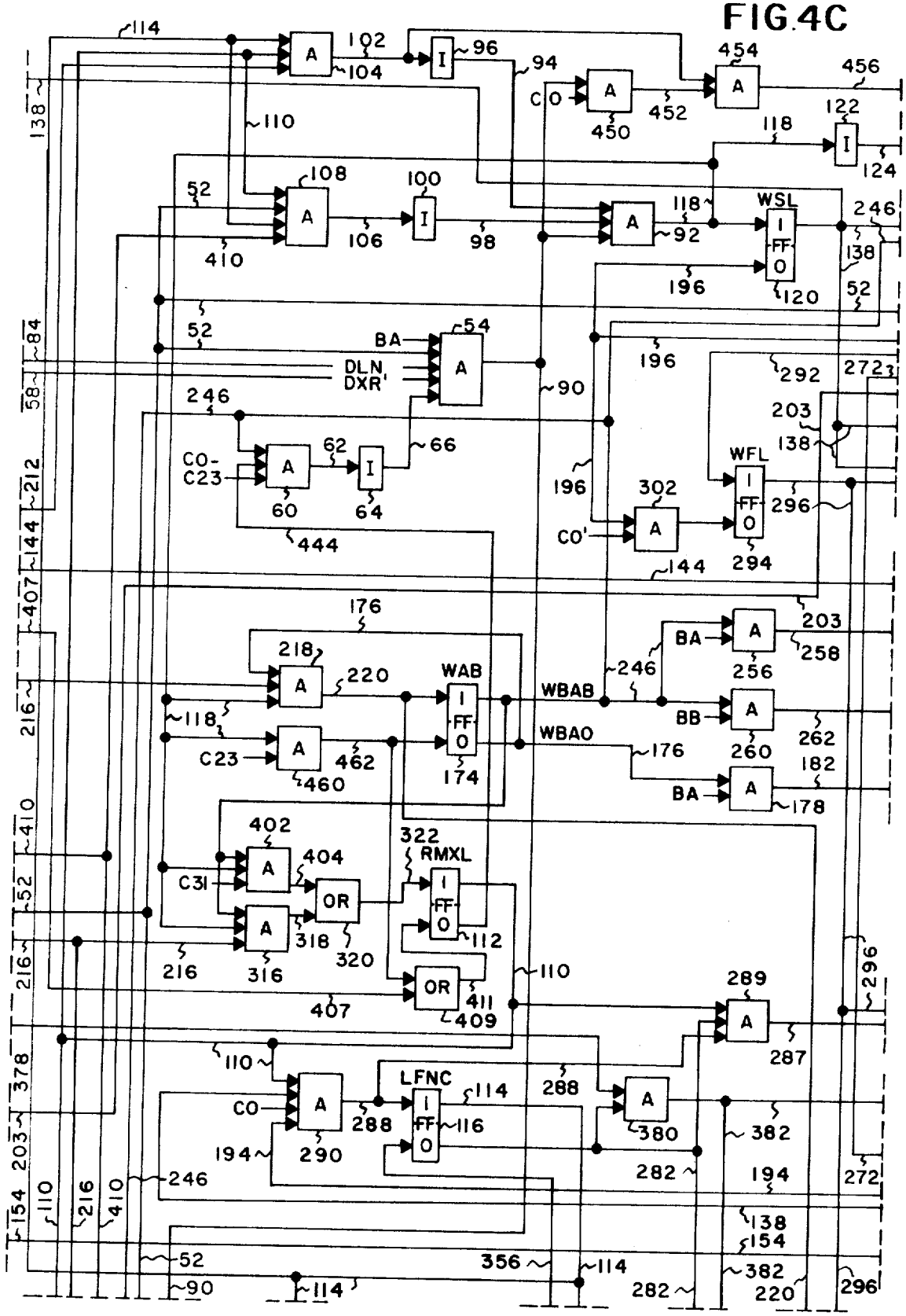
Figure 4D:
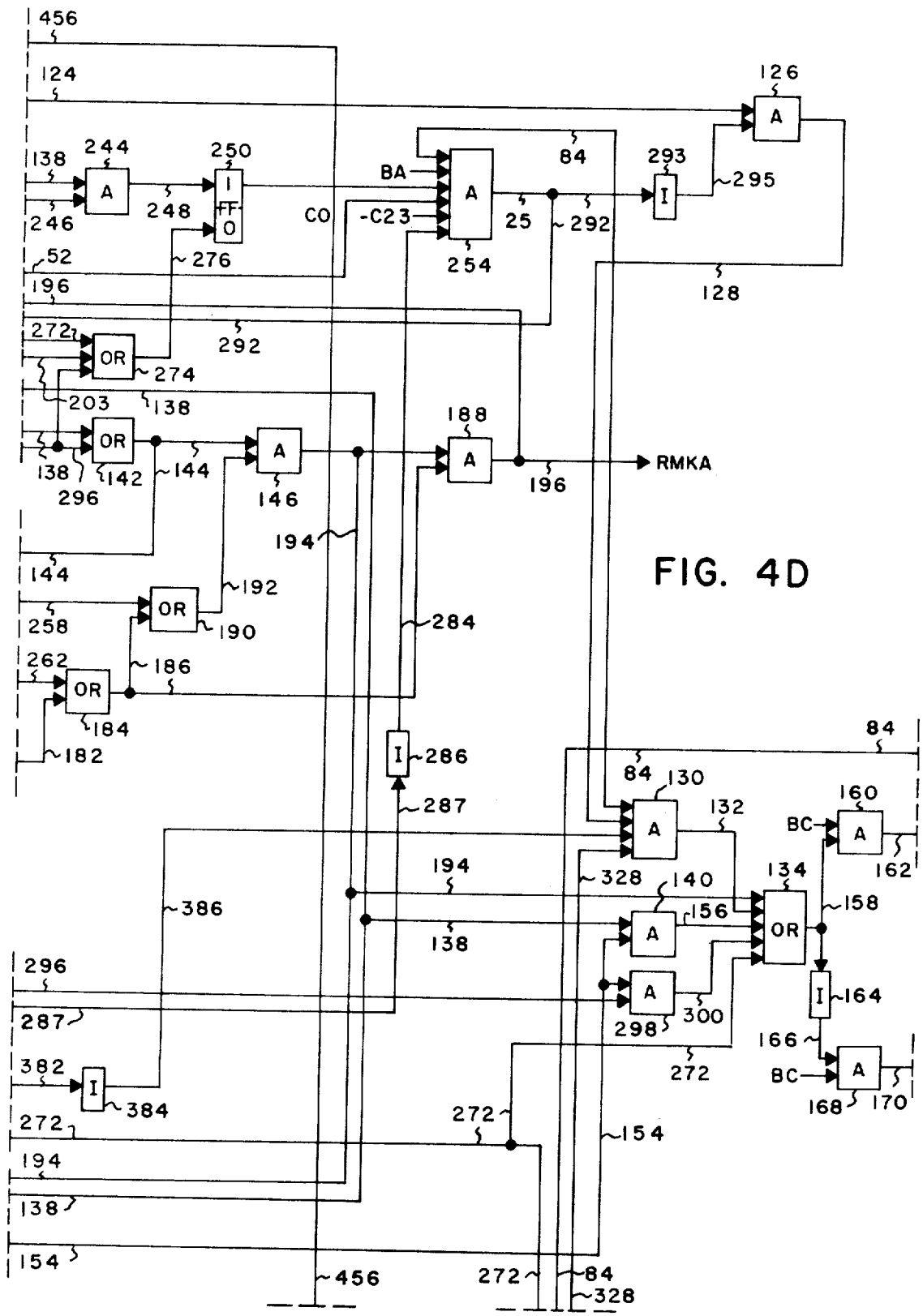

It will be assumed initially that all flip-flops in the circuit are in their ZERO state and that the system is at character position 24 of a given line with the character being applied to the system being something other than a space character. When a full character has been loaded into input buffer 46, a signal appears on full-character line 48 which signal is applied to set flip-flop 50 to its ONE state. The signal on output line 52 from the ONE side of full-character flip-flop 50 is applied, among other places, as one input to AND gate 54 (FIG. 4C). Since it has been assumed that all flip-flops were initially in their ZERO state, DXR flip-flop 56 (FIG. 4E) is in its ZERO state resulting in a signal on ZERO-side output line 58 from this flip-flop which signal is applied as a second input to AND gate 54. Since it has been assumed that the system is in C24 time, there is no signal on the C0–C23 clock line resulting in AND gate 60 being deconditioned. The absence of a signal on output line 62 from AND gate 60 results in inverter 64 applying a signal through line 66 to a third input of AND gate 54. Referring now to FIG. 4G it is seen that output line 68 from delay line memory 34 is connected as one input to AND gate 70. At the next BC time, AND gate 70 is conditioned to load the output from delay line 34 into flip-flop 72. This loading is accomplished by applying the signal on output line 74 from AND gate 70 to the ONE-side input of flip-flop 72, and applying the signal on line 74 through inverter 76, line 78, AND gate 80, and line 82 to the ZERO-side input of this flip-flop. A signal thus appears on ONE-side output line 84 from flip-flop 72 one bit time after a signal appears on output line 68 from delay line 34. The signal on line 84 is applied through AND gate 86 to line 88 leading to display device 36. The signal on line 84 is also applied as a fourth input to AND gate 54 (FIG. 4C). The final input to AND gate 54 is the BA clock line.

Thus, when the A- or cursor bit is detected in the output from delay line memory 34, and there is a character which is not one of the characters C0 through C23 to be loaded in put buffer 46, AND gate 54 is fully conditioned to generate an output signal on line 90 which signal is applied, among other places, as one input to AND gate 92. The other inputs to AND gate 92 are output line 94 from inverter 96 and output line 98 from inverter 100. The inputs to inverters 96 and 100 are output line 102 from AND gate 104 and output line 106 from AND gate 108 respectively. Output line 110 from the ONE side of RMXL flip-flop 112 (FIG. 4C) and output line 114 from the ONE side of LFNC flip-flop 116 are inputs to both AND gates 104 and 108. Since neither of these flip-flops is in its ONE state at this time, AND gate 92 is fully conditioned to generate an output signal on line 118 which signal is applied to set write-same-line (WSL) flip-flop 120 to its ONE state. The signal on line 118 is also applied to inverter 122 thus terminating the signal which is normally applied through line 124 to one input of AND gate 126 (FIG. 4D). The deconditioning of AND gate 126 terminates the signal which is normally applied through line 128 to one input of AND gate 130. Output line 84 from the ONE side of flip-flop 72 (FIG. 4G) is connected to another one of the inputs to AND gate 130, with output line 132 from AND gate 130 being applied through OR gate 134 to transfer the output from the delay line into delay line input flip-flop 136. AND gate 130 is therefore part of the delay line recirculation path. The lack of a signal on line 128 deconditions AND gate 130 and thus results in the open circuiting of the delay liner recirculation path during the BA time that a signal appears on line 118. This effectively erases the A-bit for the character presently being written into.

WSL flip-flop 120 (FIG. 4C) being in its ONE state results in a signal on ONE-side output line 138 which is applied, among other places, as one input to AND gate 140 (FIG. 4D) and through OR gate 142 and line 144 as one input to AND gate 146 and as one input to AND gate 148 (FIG. 4A). The other input to AND gate 148 is output line 150 from OR gate 152. The inputs to OR gate 152 are the B3–B8 clock lines. Therefore, AND gate 148 generates a succession of 6 output pulses during the B3–B8 clock times when WSL flip-flop 120 is in its ONE state. The pulses on output lines 153 from AND gate 148 are applied to shift the bits of the character in buffer 46 in succession onto buffer output line 154. Line 154 is connected as the second input to AND gate 140 (FIG. 4D), the output line 156 from which is connected as an input to delay line input OR gate 134. Therefore, when an A bit has been detected resulting in WSL flip-flop 120 being set to its ONE state, the input character in buffer 46 is shifted a bit at the time through AND gate 140, line 156, OR gate 134, and line 158 to be stored in delay line input flip-flop 136. This is accomplished by, at BC time, applying the signal on line 158 through AND gate 160 and line 162 to the ONE-side input of flip-flop 136 and applying the signal on line 158 through inverter 164, line 166, AND gate 168 and line 170 to the ZERO-side input of this flip-flop. Output line 172 from the ONE side of flip-flop 136 is connected as the input to delay line memory 34.

Since, as was indicated previously all flip-flops are initially in their ZERO state, WAB flip-flop 174 (FIG. 4C) is also in its ZERO state generating an output signal on ZERO-side output line 176 which is applied as one input to AND gate 178 and as one input to OR gate 180 (FIG. 4A). The second input to AND gate 178 is the BA clock line. Therefore, at BA time of the character position following the character position in which a character was just written, AND gate 178 is fully conditioned to generate an output signal on line 182 which signal is applied through or gate 184 (FIG. 4D) and line 186 to one input of AND gate 188 and to one input of OR gate 190. Output line 192 from OR gate 190 is connected as a second input to AND gate 146. Therefore, at the first BA time after the WSL flip-flop is set to its ONE state, AND gate 146 is fully conditioned to generate an output signal on line 194 which signal is applied as the second input to AND gate 188 and through OR gate 134 to cause an A bit to to be recorded in the character position presently being written into delay line memory 34. The advancing of the cursor bits is in this manner accomplished. AND gate 188 being fully conditioned results in a signal on line 196 which signal is applied to the ZERO side input of WSL flip-flop 120 (FIG. 4C) resetting this flip-flop and inhibiting further writing on this line into delay line memory 34. The signal on line 196 is also applied as one input to AND gate 198 (FIG. 4A). The other input to AND gate 198 is output line 200 from the before-mentioned or gate 180. Since there is a signal on input line 176 to OR gate 180 at this time, AND gate 198 is fully conditioned to generate an output signal on line 201 which signal is applied through OR gate 202 and line 203 to clear input buffer 46 and to the ZERO-side input of full character flip-flop 50. The input buffer and full-character flip-flop are thus reset in preparation for the receipt of the next character.

If the next character received is not a space, the above described sequence of operations is repeated with the new character being stored in the next character position in delay line memory 34 and the cursor bit again being advanced. This sequence of operations continues for succeeding characters until a space character is applied to the system. Assume now that the inputs are as shown on the first line of FIG. 3 so that the first space bit occurs in character position 26. The contents of selected bit positions in buffer 46 (FIG. 4A) are applied through lines 204 to the input of space detect AND gate 206. When a full character is in buffer 46, flip-flop 50 is set to its ONE state resulting in a signal on line 52 which is applied to the final input of AND gate 206. Therefore, when a full space character has been loaded into input buffer 46, AND gate 206 is fully conditioned to generate an output signal on line 208 which is applied to set space flip-flop 210 (FIG. 4B) to its ONE state. Output line 212 from the ONE-side of space flip-flop 210 is applied as one input to AND gate 214, the other input to this AND gate being the C24–C31 clock line. Therefore, when a space character is received, a signal appears on output line 216 from AND gate 214 during the C24–C31 clock times of each line.

BLOCK 22

Since there has been no change in the setting of the various flip-flops, when an A-bit is detected on the output from delay line 34, AND gate 54 (FIG. 4C) is again fully conditioned to generate an output signal on line 90 which, is conjunction with the other inputs which are likewise present, fully conditions AND gate 92 to generate an output signal on line 118. At this time all of the conditions required to perform the functions indicated in block 22 of FIG. 1 are present and the circuit proceeds to perform these functions. The signal on line 118 is applied to set WSL flip-flop 120 to its ONE state. The signal on line 118 is also applied to inverter 122 to cause the erasing of the A-bit for the character position in which the space is to be written. This is the first part of step two of block 22. Finally, the signal on line 118 is applied as one input to AND gate 218, the other input to this AND gate being ZERO-side output line 176 from WAB flip-flop 174 and space-character-present line 216. AND gate 218 being fully conditioned results in a signal on line 220 which is applied to set WAB flip-flop 174 to its ONE state and is also applied to set flip-flop 222 (FIG. 4F) to its ONE state. As will be seen shortly, these flip-flops being set result in steps 3 and 4 of block 22 being performed.

WSL flip-flop 120 being in its ONE state results in a signal on ONE-side output line 130 which is applied as one input to AND gate 224 (FIG. 4B), the other inputs to this AND gate being full-character line 52 and space-character-detected line 216. AND gate 224 is therefore fully conditioned at this time to generate an output signal on line 226 which signal is applied as one input to AND gates 228 and 230. The other input to AND gate 228 is the BB clock line. Therefore, at B time of the character being written, AND gate 228 is fully conditioned to generate an output signal on line 232 which signal is applied to reset the contents of space register 234. At B3 time of the same character, AND gate 230 is fully conditioned to generate an output signal on line 236 which signal is applied to condition gates 238 to pass the character count in character counters 40 through lines 240, conditioned gates 238, and lines 242 to be stored in space register 234. Step six of block 22 (FIG. 1) is in this manner performed.

As before, the signal on ONE-side output line 138 from WSL flip-flop 120 is applied to AND gate 140 (FIG. 4D) to condition this gate to pass input data to delay line memory 34 and is also applied through OR gate 142 and line 144 to condition gate 148 to shift out the message in input buffer 46. This results in the space character in buffer 46 being stored in the appropriate character position (for the example chosen, character position 26) in delay line memory 34. The signal on line 138 is also applied as one input to AND gate 244 (FIG. 4D), the other input to this AND gate being ONE-side output line 246 from WAB flip-flop 174. AND gate 244 is therefore fully conditioned to generate an output signal on line 248 which signal is applied to set flip-flop 250 to its ONE state. The resulting signal on ONE-side output line 252 from flip-flop 250 is applied as one input to AND gate 254.

Nothing further happens until A-bit time of the following character position, character position 27. At this time a BA clock pulse is applied to one input of AND gate 256 (FIG. 4C), the other input to this AND gate being ONE-side output line 246 from WAB flip-flop 174. AND gate 256 is therefore fully conditioned to generate an output signal on line 258 which signal is applied through OR gate 190 (FIG. 4D) and line 192 to an input of AND gate 146. Since there is a signal at this time on line 144, the other input to AND gate 146, a signal appears on line 194 causing an A-bit to be recorded in the A-bit position of the next character. The advancing of the cursor, step 2 of block 22 in FIG. 1, is in this manner accomplished.

At B-time of the next character position a BB clock pulse is applied to one input of AND gate 260, (FIG. 4C), the other input of this AND gate likewise being ONE-side output line 246 from the WAB flip-flop. AND gate 260 is therefore fully conditioned at this time to generate an output signal on line 262 which signal is applied through OR gate 184 and line 186 to both OR gate 190 and AND gate 188. The application of a signal to OR gate 190 causes AND gate 146 to again be fully conditioned resulting in a signal on line 194 which causes a B-bit to be recorded in this next character position. Step 3 of box 22 in FIG. 1 is in this manner accomplished. The signal on line 186, with the signal on line 194, fully conditions AND gate 188 to generate an output signal on line 196 which signal is applied to reset WSL flip-flop 120 to its ZERO state. The signal on line 196 is also applied as one input to AND gate 198 (FIG. 4A). However, since none of the inputs to OR gate 180 are present at this time, a clear operation is not performed.

Nothing further happens in the operation until bit A-time of character zero of the following line is reached. Since flip-flop 222 (FIG. 4F) was previously set to its ONE state, there is a signal on ONE-side output line 264 which is applied through OR gate 266 and line 268 to one input of AND gate 170. Signals on the C0 clock line and the BA clock line fully condition AND gate 270 to generate an output signal on line 272 which signal is applied through OR gate 134 (FIG. 4D) to cause an A-bit to be recorded in this bit position. The initializing of an A-bit position of character zero of the following line is in this manner accomplished. This effectively conditions the circuit to write subsequently received characters on both the same line and the next line. The signal on line 272 is also applied through OR gate 274 (FIG. 4D) and line 276 to reset flip-flop 250 to its ZERO state, thus deconditioning AND gate 254, and through OR gate 202 (FIG. 4A) and line 203 to clear the space character in input buffer 46 and reset the character-full flip-flop to its ZERO state.

At BB time of character zero, AND gate 270 (FIG. 4F) is again fully conditioned to generate an output signal on line 272 which signal is applied through OR gate 134 to cause a B-bit to be recorded in the character zero position of the following line. This completes the initializing operation of step 4 of block 22 in FIG. 1. All operations required in block 22 are thus completed. The signal on line 272 at this time is also applied as one input to AND gate 278, the other input to this AND gate being the BB clock line. AND gate 278 being fully conditioned results in a signal on line 280 which signal is applied to reset flip-flop 222 to its ZERO state. The circuit is thus reset in preparation for receipt of the next input character. However, WAB flip-flop 174 remains in its ONE state.

BLOCK 23

Having completed the operations indicated in block 22 of FIG. 1, the circuit is ready to begin performing the operations of block 23. Referring again to line 1 of FIG. 3, it is seen that the next character received is the letter "i" of the word "if." This character is to be stored in character position 27. However, since the circuit is not sure whether this letter is the beginning of a long or short words, this character will also initially be recorded in the character zero position of the following line. As before, when a full character has been loaded into input buffer 46, flip-flop 50 is set to its ONE state. When the A-bit in character position 27 is detected, AND gate 54 is again fully conditioned to generate an output signal on line 90 which is applied to fully conditioned AND gate 92 to generate an output signal on line 118. As before, the signal on line 118 results in the detected A-bit being erased and in WSL flip-flop 120 (FIG. 4C) being set to its ONE state. It will be remembered that a B-bit was recorded in this character position when the space character was recorded. Flip-flop 120 being in its ONE state results in a signal on line 138 which causes the character stored in buffer 46 to be recorded in delay line 34 in a manner previously described. The signal on line 138 is also applied to AND gate 244 (FIG. 4D), fully conditioning this AND gate to generate an output signal on line 248 which is applied to set flip-flop 250 to its ONE state. At BA and BB times of the following character time, AND gates 256 and 260 respectively are fully conditioned to cause an A- and a B-bit to be recorded is this following character position in a manner previously described. The output from AND gate 260 is also applied through line 262, OR gate 184, and AND gate 188 to line 196 to reset flip-flop 120 to its ZERO state.

Nothing further happens until character zero, bit A-time of the following line. At this time the A-bit which was recorded in this position when the following line was initialized is applied through line 84 to one input of AND gate 254 (FIG. 4D). Output line 252 from the ONE-side of flip-flop 250 is a second input to this AND gate. ONE-side output line 152 from character-full flip-flop 50 is a third input to this AND gate and output line 284 from inverter 286 is a fourth input. The input to inverter 286 is output line 287 from AND gate 289. Since one input to AND gate 289 is ONE-side output line 110 from RMXL flip-flop 112, AND gate 289 is not fully conditioned at this time and a signal therefore appears on line 284. The final inputs to AND gate 254 are the BA and C0–C23 clock lines. AND gate 254 is therefore fully conditioned at this time to generate an output signal on line 292 which is applied to set write-following-line (WFL) flip-flop 294 (FIG. 4C) to its ONE state. The signal on line 292 is also applied to inverter 293, thus terminating the output on line 295 and deconditioning AND gate 126. The absence of a signal on line 128 at this time results in the A-bit in character position zero being erased.

The signal on ONE-side output line 296 from flip-flop 294 is applied through OR gate 274 and line 276 to reset flip-flop 250 to its ZERO state and through OR gate 142 to line 144. The signal on line 144 results in AND gate 148 (FIG. 4A) being fully conditioned during B3–B8 times of the C0 character to cause the character in buffer 46 to be read out onto line 154. Line 154 is one input to AND gate 298 (FIG. 4D), the other input to this AND gate being the before-mentioned line 296. AND gate 298 is thus conditioned at this time to pass the characters stored in buffer 46 through line 300 and OR gate 134 to be stored in delay line memory 34. At BA and BB times of character 1, the following character on the following line, AND gates 256 (FIG. 4C) and 260 respectively are fully conditioned, resulting in output signals on lines 258 and 262 respectively. The signal on line 258 is applied through OR gate 190 and line 192 to fully condition AND gate 146 resulting in an A-bit being recorded in this following character position. The signal on line 262 results in both AND gates 146 and 188 being conditioned in a manner previously prescribed to cause a B-bit to be recorded in the character-one position and to cause a signal on line 196 which is applied to one input of AND gate 302 (FIG. 4C). The other input to AND gate 302 is a not-character-zero clock line. AND gate 302 is thus fully conditioned at this time to generate an output signal on line 304 which is applied to reset the WFL flip-flop to its ZERO state. The signal on line 196 is also applied as one input to AND gate 198 (FIG. 4A). Output line 296 from the ONE side of flip-flop 294 is applied thorugh OR gate 180 and line 200 to the other input of AND gate 198. AND gate 198 is thus fully conditioned at this time to generate an output signal on line 201 which signal is applied through OR gate 202 and line 203 to reset the character in input buffer 46 and to reset full-character flip-flop 50 to its ZERO state. The circuit is thus reset in preparation for the receipt of the next character.

The above described sequence of operations is repeated for the character "f" which is stored both in character position 28 on the first line and in character position one on the second line. From FIG. 3 it is seen that the next character appplied to the system is a space character which is to be stored in character position 29 of the first line. When this character is detected the conditions required for the performance of the steps in block 24 of FIG. 1 are satisfied. The manner in which these steps are performed will now be described.

BLOCK 24

When the loading of the space character into buffer 46 has been completed, flip-flop 50 is again set to its ONE state. The resulting output signal on line 52 fully conditions space detect AND gate 206 (FIG. 4A) to generate an output signal on line 208 which is applied to set space flip-flop 210 to its ONE state. During character times 24–31 of each line, AND gate 214 is thus fully conditioned to generate an output signal on line 216. When the A-bit which was written into character position 29 of line 1 is detected, AND gate 54 (FIG. 4C) is fully conditioned to generate an output signal on line 90 which results, in a manner previously described, in WSL flip-flop 120 being set to its ONE state. The signal on line 90 is also applied as one input to AND gate 306 (FIG. 4E), the other inputs to this AND gate being ONE-side output line 246 from WAB flip-flop 174 and space line 216. AND gate 306 is thus fully conditioned at this time to generate an output signal on line 308 which is applied through OR gate 310 and line 312 to set ISML flip-flop 314 to its ONE state. The signal on line 118 which sets the WSL flip-flop to its ONE state is also applied as one input to AND gate 316 (FIG. 4C), the other inputs to this AND gate also being the lines 216 and 246. AND gate 316 is thus fully conditioned at this time to generate an output signal on line 318 which is applied through OR gate 320 and line 322 to set RXML flip-flop 112 to its ONE state. As before, the signal on line 118 is applied to inhibit an output from AND gate 126 (FIG. 4D) causing the erasure of the A-bit in character position 29.

As with the first space bit character, the signal on ONE-side output line 138 from WSL flip-flop 120 is applied to condition AND gate 224 (FIG. 4B) resulting in a signal on line 226 which conditions AND gate 228 at BB time to reset space register 224 and which conditions AND gate 230 at B3 time to load the address in which the second space character is stored, character position 29 for the example chosen, into the space register. The signal on line 138 is also applied through conditioned AND gate 244 (FIG. 4D) and line 248 to set flip-flop 250 to its ONE state to AND gate 140 to permit information to be read into delay line memory 34 and through OR gate 142 and line 144 to condition gate 146 and to cause the space character in input buffer 46 to be shifted out. This results in the space character being stored in delay line memory 34 in a manner previously described and in the bits being recorded in the A- and B-bit positions of the following character position 30. As the B-bit is being recorded AND gate 188 is fully conditioned to generate an output signal on line 196, which signal is applied to reset WSL flip-flop 120 to its ZERO state. The operations under item 1 of box 24, with the exception of the erasing of the B-bits, are in this manner accomplished.

When ISML flip-flop 31 (FIG. 4E) was set to its ONE state this resulted in an output signal on ONE-side output line 324 which is applied as one input to AND gate 326. The other inputs to AND gate 326 are output line 282 from the ZERO-side up LFNC flip-flop 116 and output line 328 from the ZERO side of erase (ERN) flip-flop 3330. AND gate 326 is therefore fully conditioned to generate an output signal on line 32 which signal is applied to set set-erase (SERN) flip-flop 334 to its ONE state.

Nothing further happens until C0 time of the following line. At this time there are signals on ZERO-side output line 58 from DXR flip-flop 56, ONE-side output line 324 from ISML flip-flop 314, ZERO-side output line 328 from ERN flip-flop 314, ZERO-side output line 328 from ERN flip-flop 340, and ZERO-side output line 282 from LPNC flip-flop 116. These signals fully condition AND gate 336 (FIG. 4F) to generate an output signal on line 338 which signal is applied through OR gate 266 and line 268 to one input of AND gate 270. At BA time of C0, AND gate 270 is therefore fully conditioned to generate an output signal on line 272 which is applied through OR gate 134 to record an A-bit in memory 34. As before, the signal on line 272 is also applied through OR gate 274 (FIG. 4D) to reset flip-flop 250 to its ZERO state and through OR gate 202 (FIG. 4A) to reset the space character in input buffer 46 and to reset full-character flip-flop 50. At BB time of character zero, AND gate 270 is again fully conditioned to cause a B-bit to be recorded in the character zero position of the following line. The initialize operation called for in step 2 of block 24 is in this manner accomplished. It should be noted that, at B-time, AND gate 278 is also fully conditioned. However, since flip-flop 220 is already in its ZERO state, the signal on line 280 performs no useful function at this time.

Figure 4E:
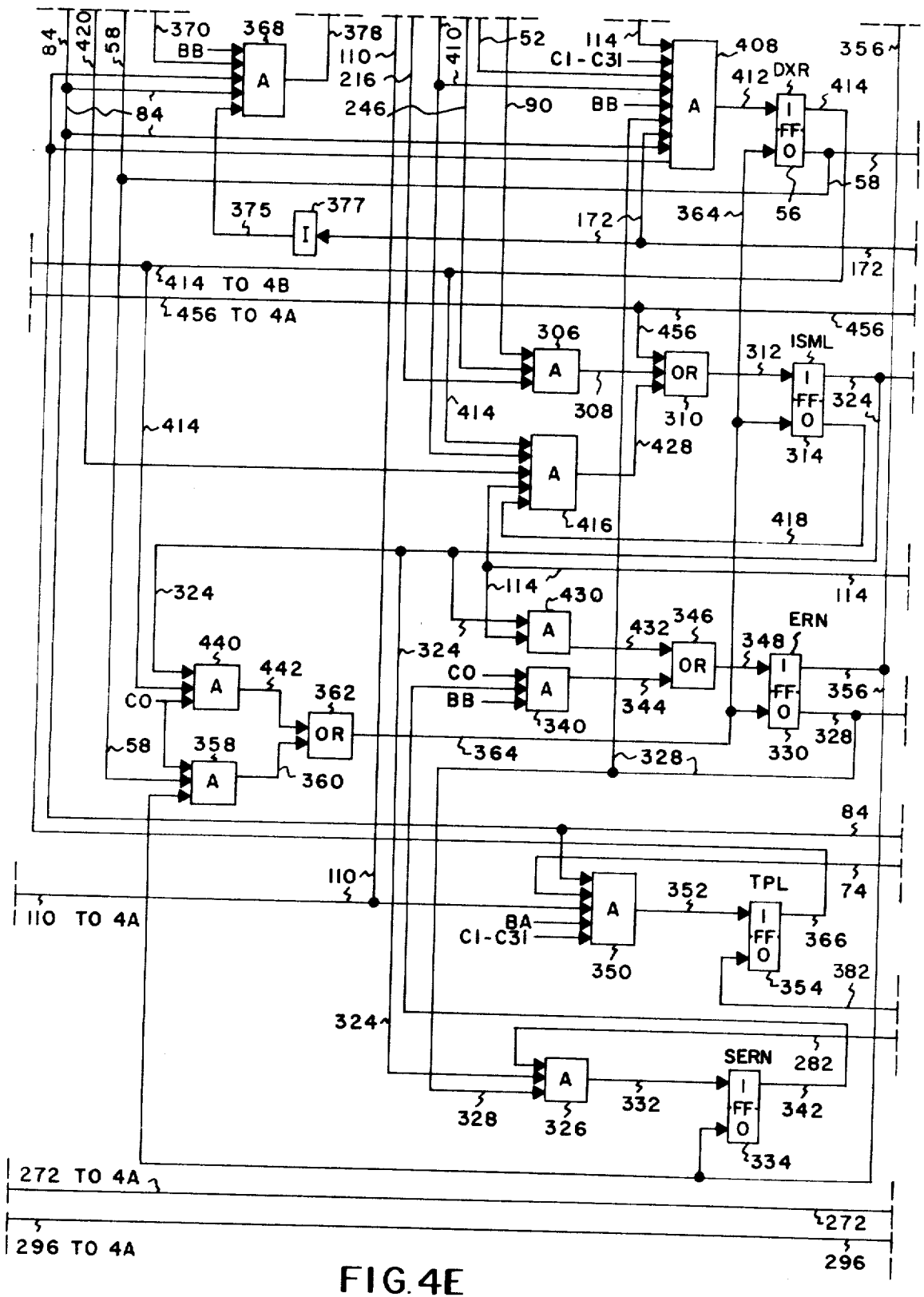
Figure 4F:
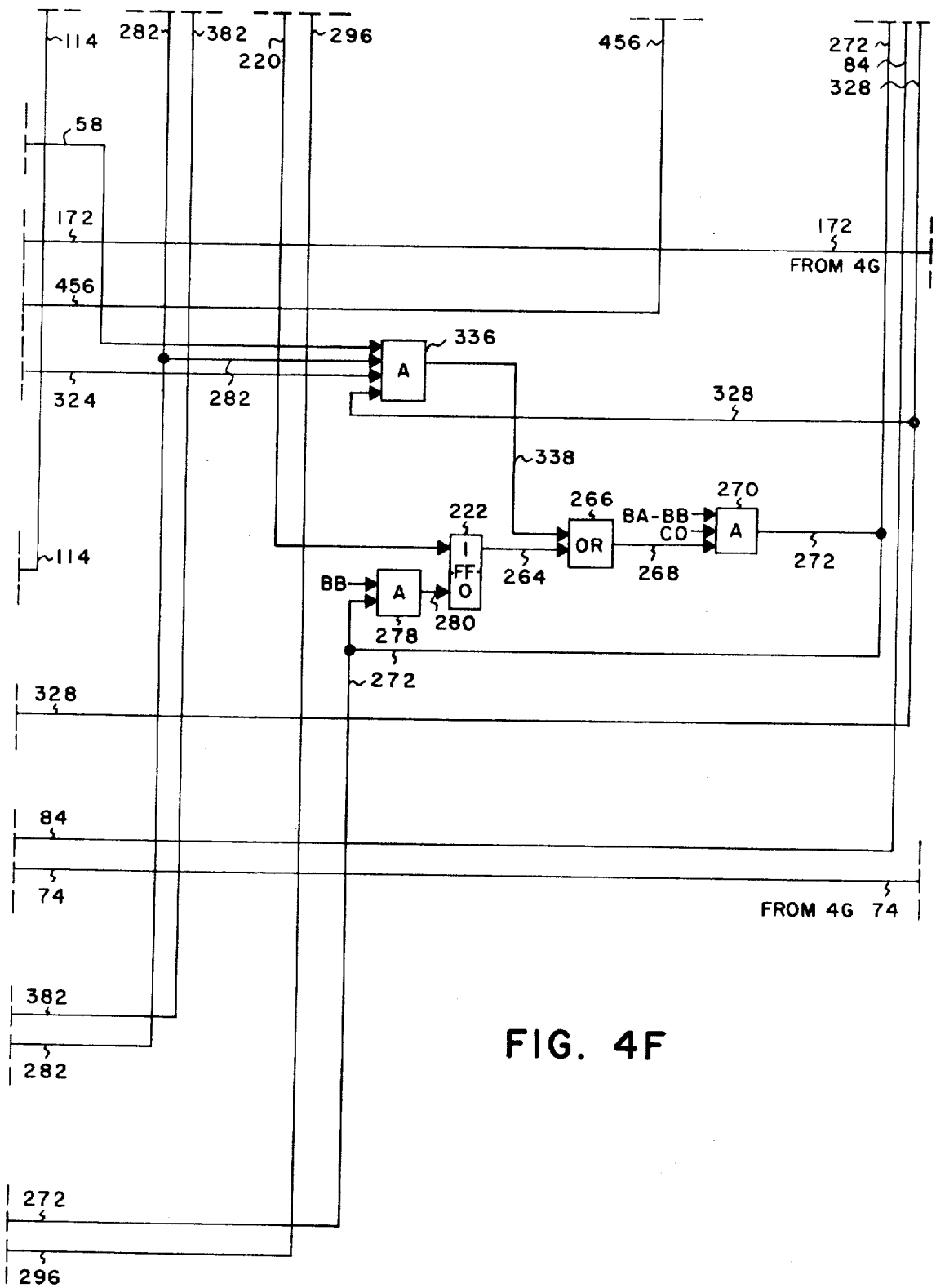
Figure 4G:
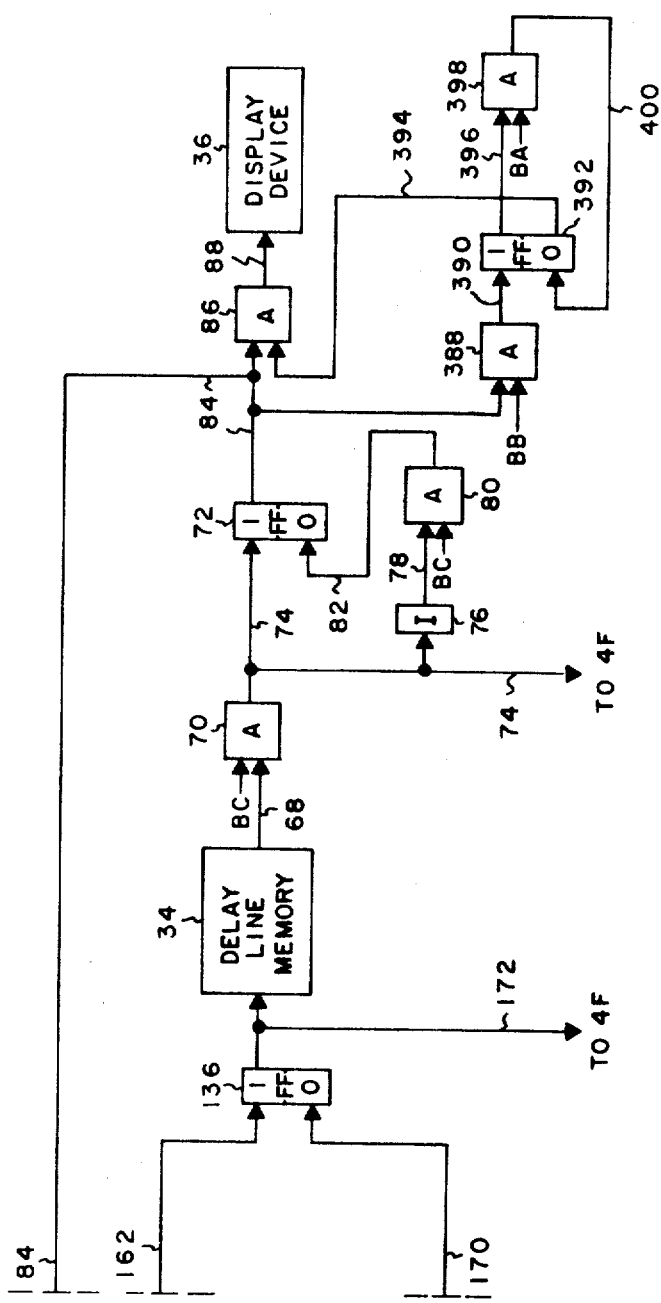

At B-time of character zero, signals are also applied to two of the inputs of AND gate 340 (FIG. 4E). The final input to this AND gate is output line 342 from the ONE-side of SERN flip-flop 334. AND gate 340 is therefore fully conditioned at this time to generate an output signal on line 344 which signal is applied through OR gate 346 and line 340 to set ERN flip-flop 330 to its ONE state. Since ZERO-side output line 328 from ERN flip-flop 330 is one of the inputs to recirculation AND gate 130 (FIG. 4D), the remaining characters on the following line, including the character in the B3–B8 positions of character zero, are effectively erased. When the letters "i" and "f" of the word "if" were written in character positions 27 and 28 of line 1, these characters were also written in character positions zero and one of line 2. Therefore, when the erase operation starts, there will be an A- and a B-bit in the first two bit positions of character position 2 of the second line. When this A-bit is stored into flip-flop 72 (FIG. 4G), prior to its being erased, an A-bit signal appears on line 84 and a B-bit signal on line 74. These signals in conjunction with the BA clock, the C2 clock, and a signal on ONE-side output line 110 from RMXL flip-flop 112 fully condition AND gate 350 (FIG. 4E) to generate an output signal on line 352 which signal is applied to set TPL flip-flop 354 to its ONE state. ERN flip-flop 330 being in its ONE-state results in a signal on ONE-side output line 356 which is applied to reset SERN flip-flop 334 to its ZERO state and as one input to AND gate 358. When the second line has been completely erased a CO clock pulse is applied to a second input of AND gate 358, the final input to this AND gate being ZERO-side output line 58 from DXR flip-flop 56. AND gate 358 is thus fully conditioned at this time to generate an output signal on line 360 which signal is applied through OR gate 362 and line 364 to reset both the ISML flip-flop 314 and the ERN flip-flop 330 to their ZERO state. The erased operation is in this manner terminated. Step 2 of block 24 in FIG. 1 is in this manner completed.

The only remaining operation to be performed from block 24 is the "start erasing B-bits" step. The setting of TPL flip-flop 354 was a first step in this operation. ONE-side output line 366 from TPL flip-flop 354 is connected as one input to AND gate 368 (FIG. 4E). A second input to AND gate 368 is ONE-side output line 370 from flip-flop 372 (FIG. 4B). Flip-flop 372 is set to its ONE state by a signal on output line 374 from N-stage counter 376. Counter 376 is incremented every time an LO clock pulse is generated. A signal appears on line 374 each time counter 376 is stepped from a count of N to a count of zero. Therefore, this signal appears once for every N-cycles of delay line memory 34. It is desired that pulses appear on line 374 at a somewhat greater rate than characters are applied to the system so that, as will be seen shortly, B-bits are erased at a somewhat faster rate than characters are received, thus permitting the display to catch up with the writing. In a preferred embodiment of the invention characters are received at 100 w.p.m. or 98.9 milliseconds per character. The recirculation time of delay line 34 and the associated flip-flops is 7.7 milliseconds. Therefore, if N is ten, a B-bit may be erased every 77 milliseconds while characters are received every 98.9 milliseconds. The desired simulated line rate is in this manner achieved.

From the above it is apparent that at some time, either before or after TPL flip-flop 354 is set ot its ONE state, flip-flop 372 will be set to its ONE state resulting in an output signal on line 370. The other inputs to AND gate 364 are output line 84 from the delay line memory complex, the BB clock line, and output line 375 from inverter 377. The input to inverter 377 is ONE-side output line 172 from flip-flop 136 (FIG. 4G). When the B-bit of a character is on line 84, the A-bit of the same character will be on line 172. Therefore, the first B-bit not accompanied by an A-bit which is detected after both flip-flops 354 and 372 are in their ONE state will fully condition AND gate 368 to generate an output signal on line 378. Since flip-flop 372 is set at LO time and flop 354 is set after the last B-bit in a frame as detected, AND gate 368 will always be fully conditioned by the first B-bit which appears on the screen which does not have an A-bit associated with it. Line 378 is connected to the ZERO-side input of flip-flop 372 thus inhibiting further output from AND gate 368 and is also connected as one input to AND gate 380 (FIG. 4C). The other input to AND gate 380 is ZERO-side output line 282 from LFNC flip-flop 116. AND gate 380 is therefore fully conditioned at this time to generate an output signal on line 382 which signal is applied to reset TPL flip-flop 354 to its ZERO state. The signal on line 382 is also applied to inverter 384 (FIG. 4D) to inhibit the application of a signal to line 386. Line 386 is one input to feedback AND gate 130. The absence of a signal on line 386 is therefore effective to cause the erasure of the detected B-bit.

At this point it might be well to look at the effect which the presence or absence of the B-bit in a character has on the display of the stored character. Line 84 is connected as one input to output AND gate 86 (FIG. 4G) and also as one input to AND gate 388. The second input to AND gate 388 is the BB clock line. Therefore, when a B-bit is detected in a character being outputted, AND gate 388 is fully conditioned to generate an output signal on line 390 which signal is applied to set flip-flop 392 to its ONE state. Since ZERO-side output line 394 from flip-flop 392 is the second input to output AND gate 86, flip-flop 392 set to its ONE state inhibits the application of the character containing the B-bit to output line 88. ONE-side output line 396 from flip-flop 392 is connected as one input to AND gate 398. The other input to AND gate 398 is the BA clock line. Therefore at BA clock time of the character following that which the B-bit was detected, AND gate 398 is fully conditioned to generate an output signal on line 400 which signal is applied to reset flip-flop 392 to its ZERO state. A B-bit in a character stored in delay line memory 34 is thus effective to inhibit the appliuation of the character to display device 36. Thus, the erasure of a B-bit is effective to permit the stored character to be displayed.

Since RMXL flip-flop 112 (FIG. 4C) remains in its ONE state, the next time that an AB-bit combination is detected in a character position other than character position zero, as, for example, the A- and B-bits in the next character to be written on line 1, (i.e. character position 30) AND gate 350 (FIG. 4E) is again fully conditioned to set TPL flip-flop 354 to its ONE state. Some number of delay line cycles later, when counter 376 sets flip-flop 372 to its ONE state and a B-bit unaccompanied by an A-bit is detected, AND gate 368 will again be fully conditioned to generate an output signal on line 378 which signal causes this B-bit to be erased and resets both flip-flops 354 and 372. Succeeding B-bits of the word "IN" are in this manner erased.

While this erasure of B-bits is occurring, new characters are being received at input buffer 46. These characters will be stored in character positions of memory 34 corresponding to display position C30 and C31 of the first line and also in character positions corresponding to characters C0 and C1 of the second line. The manner in which these characters are stored is identical to that previously described.

Two factors be noted. First, it is possible that, since the erasure of the bits is at a faster rate than that at which new characters are being applied to the system, B-bits may be erased in characters following the last space character on the line (i.e. in characters should not be displayed). To avoid this possibility, output line 378 from AND gate 368 (FIG. 4E) is connected as one input to AND gate 399 (FIG. 4B), the other input to this AND gate being match output line 401 from compare circuit 403. The inputs to compare circuit 403 are output lines 240 from character counter 40, which lines contain the count of the character presently being read and written in the delay line memory, and output lines 405 from space register 234. A signal therefore appears on match line 401 when the character presently being written into is the character in which the last space bit was recorded. AND gate 399 therefore generates an output signal on line 407 when the B-bit in this character position is being erased. The signal line 407 is applied through OR gate 409 and line 411 to reset RMXL flip-flop 112. This effectively inhibits the erasure of any more B-bits until a new space character is detected on the same line when or until the end of the line is reached.

When the letter "O" is being written into character postion 31, all inputs to AND gate 402 (FIG. 4C) are present, resulting in a signal on output line 404 which is applied through OR gate 320 to the ONE-side input of RMXL flip-flop 112. However, unless this flip-flop was reset by an output from AND gate 399, this flip-flop is already in its ONE state at this time and the signal on line 404 is ineffectual. When the writing of the "φ" character in character position 31 has been completed, the character count advances from C31 to C0. The A- and B-bits for the next character are thus written in the appropriate positions of character 0 of the following line. The signal applied to line 194 at this time to cause the writing of the A-bit in the character 0 position fully conditions AND gate 290 (FIG. 4C) to generate an output signal on line 288 which signal is effective to set LPNC flip-flop 116 to its ONE state. The signal on line 288 is also applied through AND gate 289, the other inputs to which are all present at this time, line 287, and inverter 286 to terminate the signal on line 284, thus inhibiting the setting of WFL flip-flop 294 to its ONE state at this time. This is necessary, since the "P" character is already written in the C0 chadacter position on line 2 at this time and it is not desired to write over this character. When the A-bit of the C1 character on the second line (the character position in which it is desired to also write the "O" character) is reached, all inputs to AND gate 254 (FIG. 4D) are present resulting in an output signal on line 292 which is applied to set the WFL flip-flop to its ONE state. This results in the "O" character being recorded in this character position, in an A- and a B-bit being recorded in the following character position, and in input buffer 46 being clear and full character flip-flop 50 being reset all in a manner previously described.

BLOCK 26

Nothing further happens until the next character which it is desired to display is applied to input buffer 46. Referring now to FIG. 1, it is seen that at this time a decision must be made as to whether this next character is a space character. For the example being used in the present discussion, the next character is not a space character and the system, therefore, proceeds to perform the steps of block 26 (FIG. 1). It should be noted that, once the last character has been recorded on a line, either the B-bits alone or all the characters on the line will be erased. Therefore, the flip-flop was set to its ONE state when the end of the line was reached. However, as will be seen shortly, the actual erasure of B-bits is inhibited until the LFNC flip-flop being in its ONE state presents TPL flip-flop 354 (FIG. 4E) to be periodically set to its ONE state, in a manner previously described, each time an A-bit is detected in a character position other than character position zero. When the TPL flip-flop is in its ONE state, the resulting output signal on line 366 is applied as one input to AND gate 408 (FIG. 4E). Since, as was just indicated, the character applied to the system at this time is not a space character, space flip-flop 210 (FIG. 4B) is in its ZERO state resulting in a signal on ZERO-side output line 410 which is applied as a second input to AND gate 408. Output line 52 from the ONE-side of full character flip-flop 50 is a fourth input to this AND gate and output line 114 from the ONE-side of LFNC flip-flop 116 is a fourth input. The fifth input to AND gate 408 is ZERO-side output line 328 from ERN flip-flop 330. The remaining inputs to AND gate 408 are output line 84 from the delay line memory, input line 172 to the delay line memory, the BB clock line, and the C1–C31 clock line. Gate 408 is thus fully conditioned when a character other than a space character is in input buffer 46, consecutive A and B-bits have been detected in a character position other than character position 0, the LFNC and TPL flip-flops are in their ONE states, and the ERN flip-flop is in its ZERO state. When AND gate 408 is fully conditioned, it generates an output signal on line 412 which signal is applied to set DXR flip-flop 56 to its ONE state. The signal on ZERO-side output line 410 from the space flip-flop (FIG. 4B) is also applied as one input to AND gate 108 (FIG. 4C), the other inputs to this AND gate being output line 52 from the ONE-side of full character flip-flop 50, output line 114 from the ONE-side of LFNC flip-flop 116, and output line 110 from the ONE side of RMXL flip-flop 112. AND gate 108 is thus fully conditioned at this time to generate an output signal on line 106. The signal on line 106 prevents inverter 100 from generating an output signal on line 98 thus preventing AND gate 92 from being fully conditioned. This inhibits the setting of WSL flip-flop 120, thus preventing the writing of the character in buffer 46 on the first line.

Output line 414 from the ONE side of DXR flip-flop 56 (FIG. 4E) is connected as one input to AND gate 416. Other inputs to this AND gate are output line 114 from the ONE side of LFNC flip-flop 116, output line 418 from the ZERO side of ISML flip-flop 314, and output line 410 from the ZERO side of space flip-flop 210. The final input to AND gate 416 is ONE-side output line 420 from compare flip-flop 422 (FIG. 4B). Compare flip-flop 422 is set to its ONE state by a signal on output line 424 from AND gate 426. The inputs to AND gate 426 are ONE-side output line 414 from DXR flip-flop 56, match output line 401 from compare circuit 403, delay line memory output line 84, and the BB clock line. Therefore AND gate 426 is fully conditioned to set compare flip-flop 422 when, after the DXR flip-flop is set, a B-bit is detected in the character position at which the last space was detected. Since there is insufficient room on the line to complete another word, it is now desired that all characters following this space be erased. The manner in which this erasure is accomplished will now be described.

When the character position in which the last space on the first line is stored, is located, AND gate 416 (FIG. 4E) will thus be fully conditioned to generate an output signal on line 428 which signal is applied through OR gate 310 and line 312 to set ISML flip-flop 314 to its ONE state. A signal on output line 324 from the ONE side of ISML flip-flop 314 is applied as one input to AND gate 430, the other input to this AND gate being ONE-side output line 114 from LFNC flip-flop 116. AND gate 430 is thus fully conditioned at this time to generate an output signal on line 432, which signal is applied through OR gate 346 and line 348 to set ERN flip-flop 330 to its ONE state. ERN flip-flop 330 being in its ONE state causes the signal on ZERO-side output line 320 to be terminated, thus deconditioning feedback AND gate 130 (FIG. 4D) and resulting in the remaining characters on the first line being erased. The desired erase operation is in this manner accomplished.

Output line 420 from compare flip-flop 422 (FIG. 4B) is also connected as one input to AND gate 434, the other input to this AND gate being the BOV output line from bit counter 38. Output line 438 from AND gate 434 is connected to reset the compare flip-flop to its ZERO state. The compare flip-flop is thus set for only one character time. Output line 356 from the ONE side of flip-flop 330 (FIG. 4E) is connected to reset LFNC flip-flop 116 to its ZERO state. The LFNC flip-flop being restored to its ZERO state reconditions AND gate 380, thus permitting the erasure of B-bits to recommence. Output line 414 from the ONE-side of DXR flip-flop 56 and output line 324 from the ONE side of ISML flip-flop 314 are connected as two of the inputs to AND gate 440 (FIG. 4E). The final input to this AND gate is the C0 clock line. Therefore, at character 0 time of the following line, when the erasure of characters on the first line has been completed, AND gate 440 is fully conditioned to generate an output signal on line 442 which signal is applied through OR gate 362 and line 364 to reset the ERN, ISML, and DXR flip-flops to their ZERO state. Since the resetting of the ERN flip-flop is not instantaneous, any A-bit in the C0 position will also be erased.

The first two letters of the word "POSITION" are recorded in character positions 0 and 1 on the second line and there is an A- and a B-bit stored in the first two bit positions of the third character on this line. It is now desired to store the S character in input buffer 46 in the third character position. After the erase operation of the first line has been completed, the delay line memory continues to advance until the A-bit of the third character position of the second line appears on output line 34 from delay line memory. When this occurs, two of the inputs to AND gate 54 (FIG. 4C) are present. There is also a signal on ONE-side output line 52 from character full flip-flop 50 which is applied as a third input to AND gate 54 and, since DXR flip-flop 56 was reset to its ZERO state, there is a signal on line 58 which is applied as a fourth input to the AND gate. Finally, since RMXL flip-flop 112 is in its ONE state, there is no signal on ZERO-side output line 444 from this flip-flop and AND gate 60 is therefore deconditioned permitting inverter 64 to fully condition AND gate 54 to generate an output signal on line 90 which is applied as one input to AND gate 92. LFNC flip-flop 116 being reset to its ZERO state terminates the signal on ONE-side output line 114, thus deconditioning AND gates 104 and 108. Inverters 96 and 100 thus apply the remaining two inputs to AND gate 92 fully conditioning this AND gate to generate an output signal on line 118 which is applied to set WSL flip-flop 120 to its ONE state. As was indicated previously, the setting of the WSL flip-flop to its ONE state permits the character in input buffer 46 to be recorded in the character position in which the A-bit was detected and causes the cursor bit to be advanced to the next character position. Since WAB flip-flop 174 is still in its ONE state, the setting of the WSL flip-flop to its ONE state also causes a B-bit to be recorded in the next character position and causes flip-flop 250 to be set to its ONE state. When the recording of the character in the third character position has been completed, and a B-bit in the following character position has been recorded, AND gate 260 (FIG. 4C) is fully conditioned to generate an output signal on line 262 which is applied through OR gate 184 to fully condition AND gate 188 to generate an output signal on line 196. The signal on line 196 is applied as ONE input to AND gate 198 (FIG. 4A). Since RMXL flip-flop 112 is in its ONE state at this time, there is a signal on ONE-side output line 110 which is applied through OR gate 180 and line 200 to the other input of AND gate 198. This fully conditions AND gate 198 to generate an output signal on line 201 which is applied through OR gate 202 and line 203 to reset input buffer 46, reset character full flip-flop 50 and flip-flop 250 to their ZERO state. The signal on line 196 is also applied to reset WSL flip-flop 120 to its ZERO state.

As each new character is applied to input buffer 46, it is stored in the character position containing an A-bit, the next character position on the second line, in a manner identical to that described above. Since the WAB flip-flop is in its ONE state, a B-bit will be stored with each of these characters. Since the RMXL flip-flop is also stored in its ONE state, the erasure of previously written B-bits continues at an accelerated rate until, by character 23 time, the erase operation catches up with the write operation. What happens at this time will be described shortly.

BLOCK 25

In the discussion above it was assumed that the characters received after a character was written in character position 31 of a given line was not a space character. Referring now to line 3 of FIG. 3, assume that after the character "E" of the word "write" has been written, the next character received is a space character. Under these conditions, the steps indicated in block 25 of FIG. 1 will be performed. At the beginning of this operation WAB flip-flop 174, RMXL flip-flop 112 and LFNC flip-flop 116 are all in their ONE state. All other flip-flops in the circuit are in their ZERO state. The detection of the space character in input buffer results in full-character flip-flop 50 being set to its ONE state and in the space flip-flop 210 being set to its ONE state. Space flip-flop 210 being in its ONE state results in a signal on output line 212 which output is connected as one input to AND gate 104 (FIG. 4C). The other two inputs to this AND gate are output line 110 from the ONE-side of RMXL flip-flop 112 and output line 114 from the ONE side of LFNC flip-flop 116. AND gate 104 is thus fully conditioned at this time to generate an output signal on line 102 which signal is applied to inverter 96 to inhibit the conditioning of AND gate 92. This prevents WSL flip-flop 120 from being set to its ONE state and thus inhibits the writing of the space character on either the first or second line. This is desirable since the word ends at the end of a line and the space is not needed to separate words.

Nothing further happens until the A-bit in character 0 of the following line is detected. At this time all inputs to AND gate 54 (FIG. 4C) (AND gate 60 is deconditioned by the absence of a signal on ZERO-side output line 444 from RMXL flip-flop 112) are present resulting in an output signal on line 90 which is applied as one input to AND gate 450. Since there is a signal on the C0 clock line which is the other input to this AND gate, AND gate 450 is fully conditioned to generate an output signal on line 452 which signal is applied as one input to AND gate, 454, the other input to this AND gate being the before mentioned output line 102 from AND gate 104. AND gate 454 is thus fully conditioned to generate an output signal on line 456 at this time which signal is applied through OR gate 310 (FIG. 4C) and line 312 to set ISML flip-flop 314 to its ONE state and is also applied through OR gate 202 (FIG. 4A) and line 203 to clear input the signal on One-side output line 114 from LFNC flip-flop flop 314 being in its ONE state results in a signal on ONE-side output line 324 which singal, in conjunction with the signal on ONE-side output line 114 from LFNCflip-flop 116, fully conditions AND gate 430 (FIG. 4E) to generate an output signal on line 432 which is applied to set ERN flip-flop 330 to its ONE state. As indicated previously, this terminates the signal on ZERO-side output line 328 thus resulting in the erasure of the B-bit and all subsequent bits in the character ZERO position of the second line, and in the erasure of all subsequent characters on this line. ONE-side output line 356 from the ERN flip-flop is connected to reset LFNC flip-flop 116 to its ZERO state thus permitting the erasure of B-bits to recommence. At C0 time of the fourth line, all inputs to AND gate 358 are present resulting in an output signal on line 360 which is applied through OR gate 362 and line 364 to reset the ERN and ISML flip-flops to their ZERO state. The circuit is thus restored to an initial condition in preparation for the receipt of the next character. Since an A- and a B-bit have been left in character position 0 of the fourth line, and this is the only character position which contains an A-bit at this time, subsequently received characters will be stored starting at this character position in a manner identical to that described above for the writing of the second line at the end of block 26.

C23 REACHED

As was indicated above, the writing of characters on the new line and the erasure of B-bits will proceed on the second line until, just before character position 23 is about to be written into, the erasure of B-bits catches up with the write operation. When AND gate 92 (FIG. 4C) is fully conditioned to generate an output signal on line 118 to set the WSL flip-flop for the writing of a character into character position 23 of the second line, the signal on line 118 is also applied to one input of AND gate 460 (FIG. 4C). The second input to AND gate 460 is the C23 clock line. AND gate 460 is thus fully conditioned this time to generate an output signal on line 462 which signal is applied to reset WAB flip-flop 174 to its ZERO state. The signal on line 462 is also applied through OR gate 409 and line 411 to reset RMXL flip-flop 112 to its ZERO state. Thus, when the writing of the character in character position 23 has been completed, the circuit is in exactly the same condition it was in when the description of operation began with all flip-flops in their ZERO state. The circuit will thus be writing characters without B-bits on only the second line of the display and will be looking for a space character. The operations which are performed when the first space character is detected in a character position 24 through 31 have been described above.

A circuit for dividing serially received information into a multi-line format, with each line being no more than a predetermined length, and with a maximum number of characters being stored on each line, while still permitting breaks between lines to occur at natural breaks in the information has thus been described. While the invention has been particularly shown and described with reference to a preferred embodiment thereof, it will be understood by those skilled in the art that various changes in form and details may be made therein without departing from the spirit and scope of the invention.

What is claimed is:

1. A system for editing incoming characters of information, which are to be stored in a multiline format with a maximum of N characters per line, in a manner such that a maximum number of characters are stored on each line while permitting breaks in information between lines to occur only at natural break points in the information, comprising:

means for detecting said natural break points;
   means responsive to the detecting of the first natural break point after a predetermined number of characters has been stored on a given line for causing subsequently received characters to be stored both in succeeding character positions on said given line and in character positions starting at the first character position on the following line;
   means responsive to the detection of a subsequent break point on said given line for erasing the characters stored on the following line; and
   means responsive to the failure to detect a break point between the last detected breakpoint on said given line and the beginning of the next line for erasing the characters stored after the last break point on said given line.

2. A system of the type described in claim 1 wherein said stored information is utilized to control the display on a display device;
   said system including means for inhibiting the display of a stored character;
   means, included as part of said first break point detection responsive means, for enabling said inhibiting means for characters stored both in said given line and said following line;
   second means responsive to the detection of a subsequent break point on said given line for selectively permitting the inhibited characters on said given line to be displayed; and
   second means responsive to the failure to detect a subsequent break point for selectively permitting the inhibited characters on said following line to be displayed.

3. A system of the type described in claim 2, wherein, when inhibited characters are permitted to be displayed, the inhibition is removed sequentially from the characters at a rate which is slightly greater than the rate at which new characters are applied to the system; and
   wherein said inhibiting means remains enabled until the display of characters catches up with the new characters being applied to the system.

4. A system of the type described in claim 2 wherein said inhibiting means includes means for storing a bit in a predetermined bit position of each character; and
   means responsive to the detection of a bit in said predetermined bit position for preventing the character from being applied to the display device.

5. A system of the type described in claim 2 including means for indicating that the last subsequent break point on said given line is being permitted to be displayed; and
   means responsive to said indicating means for preventing other inhibited characters from being displayed until either another break point is detected or until the end of said given line is reached.

6. A system of the type described in claim 1, wherein said natural break points are the space characters between words.

7. A system of the type described in claim 1 including means for indicating that character N on a given line has been written;
   means operative when character N is not a space character for determining whether the next character applied to the system is a space character;
   means responsive to the determination that said next character is a space character for inhibiting the storage of said space character and for enabling said means responsive to the detection of a subsequent break point; and
   means responsive to the determination that said character is not a space character for storing such character in the next succeeding character position on said following line and for enabling said means for erasing the characters stored after the last break point on said given line.

References Cited

UNITED STATES PATENTS

| | | |
|---|---|---|
| 3,046,527 | 7/1962 | Rowley et al. |
| 3,185,966 | 5/1965 | Bennett et al. |
| 3,248,705 | 4/1966 | Dammann et al. |
| 3,307,154 | 2/1967 | Garth, Jr., et al. |
| 3,386,552 | 6/1968 | Lorber et al. |

GARETH D. SHAW, Primary Examiner

U.S. Cl. X.R.

197—19; 95—4.5